United States Patent [19]

Dünwald et al.

[11] Patent Number: 4,954,577
[45] Date of Patent: Sep. 4, 1990

[54] LACQUER BINDERS, COATING COMPOSITIONS AND WIRE ENAMELS BASED ON POLYAMIDEIMIDES AND ISOCYANATES CARRYING CARBODIIMIDE AND/OR URETONE IMINE GROUPS

[75] Inventors: Willi Dünwald; Hans Schlegel, both of Leverkusen; Reinhard Halpaap; Josef Pedain, both of Cologne, all of Fed. Rep. of Germany

[73] Assignee: Bayer Aktiengesellschaft, Leverkusen, Fed. Rep. of Germany

[21] Appl. No.: 184,494

[22] Filed: Apr. 18, 1988

[30] Foreign Application Priority Data

Apr. 28, 1987 [DE] Fed. Rep. of Germany ....... 3714033

[51] Int. Cl.$^5$ .................... C08G 18/64; C08G 18/80
[52] U.S. Cl. ...................................... 525/420; 528/45; 528/48; 528/51; 525/424
[58] Field of Search ................. 525/420, 424; 528/48, 528/45, 51

[56] References Cited

U.S. PATENT DOCUMENTS 3,658,773  4/1972  Zecher et al. ..................... 528/48
4,248,978  2/1981  de Cleur et al. ................... 525/124
4,332,925  6/1982  Lee et al. ........................... 528/48

FOREIGN PATENT DOCUMENTS 0005230  11/1979  European Pat. Off. .
1795752   8/1974  Fed. Rep. of Germany .

Primary Examiner—Morton Foelak
Assistant Examiner—Frederick Krass
Attorney, Agent, or Firm—Connolly and Hutz

[57] ABSTRACT

Lacquer binders suitable for the production of highly heat-resistant films and coatings consisting of a mixture of (a) polyamide-imides based on trimellitic anhydride, lactams and diisocyanates,
(b) organic compounds carrying (i) carbodiimide and/or uretone imine groups and (ii) blocked isocyanate groups and optionally,
(c) auxiliaries and additives.

The use of these binders in coating compositions for heat-resistant substrates and a process for the production of wire enamels using said coating compositions.

6 Claims, No Drawings

LACQUER BINDERS, COATING COMPOSITIONS AND WIRE ENAMELS BASED ON POLYAMIDEIMIDES AND ISOCYANATES CARRYING CARBODIIMIDE AND/OR URETONE IMINE GROUPS

BACKGROUND OF THE INVENTION

This invention relates to new lacquer binders containing high molecular weight polyamide imides and special polyisocyanates containing blocked isocyanate groups, to their use in coating compositions for heat-resistant substrates and to a process for the production of wire enamels using coating compositions containing these binders.

It is already known that high molecular weight polyamide imides can be used for the production of highly heat-resistant films and coatings, more especially for wire lacquering (cf for example DE-AS No. 1 256 418, FR-P No. 1,375,461, U.S. Pat. No. 3,541,038 or U.S. Pat. No. 3,625,911). However, these polyamide imides, which are generally obtained by reaction of trimellitic anhydride with diisocyanates, are attended by the disadvantage that they are only soluble in highly polar, generally very expensive solvents such as, for example, N-methylpyrrolidone, dimethylformamide or dimethylacetamide. Accordingly, there has been no shortage of attempts to modify the polyamide imides in such a way that they may also be processed in other solvents, for example in cresols. The polyamide imides may be modified in this way by the use of lactams, particularly ε-caprolactam, during their production. Polyamide imides such as these containing lactams in incorporated form are described, for example in DE-AS No. 1 795 752. Although the polyamide imides according to this prior publication show very good solubility in the phenolic solvents normally used in wire lacquering, they are attended by the disadvantage that the lacquer films formed during the wire lacquering process are inferior in their mechanical and thermal properties to corresponding lacquer films based on analogous, but "lactam-free" polyamide imides.

It has now surprisingly been found that this quality disadvantage of the polyamide imides according to DE-AS No. 1 795 752 may be almost completely eliminated if the polyamide imides are used in combination with certain organic compounds containing carbodiimide and/or uretone imine groups and also blocked isocyanate groups.

SUMMARY OF THE INVENTION

Accordingly, the present invention relates to lacquer binders containing polyamide imides suitable for the production of highly heat-resistant films and coatings, characterized in that they are mixtures of (a) high molecular weight compounds containing recurring structural units corresponding to the following general formula

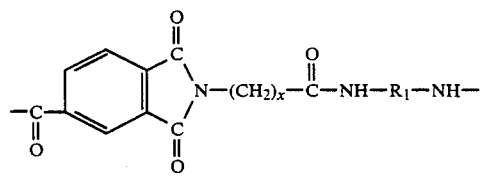

in which $R_1$ is an alkylene radical, a cycloalkylene radical or an arylene radical optionally containing methylene bridges, these radicals optionally being substituted by aryl groups or halogen, and x is an integer of from 2 to 12, (b) organic compounds containing (i) carbodiimide and/or uretone imine groups and (ii) blocked isocyanate groups and, optionally, (c) other auxiliaries and additives, 1 to 100 parts by weight of component (b) being present to 100 parts by weight of component (a).

The present invention also relates to the use of these binders in coating compositions for heat-resistant substrates.

The present invention also relates to a process for the production of wire enamels by coating of wires with a coating composition containing binders inert solvents and, optionally, the auxiliaries and additives normally used in lacquer technology with subsequent hardening of the coating at temperatures above 80° C., characterized in that coating compositions containing as binders those of the type mentioned above are used.

DETAILED DESCRIPTION OF THE INVENTION

Component (a) of the binders according to the invention consists of high molecular weight polyamide imides containing recurring structural units corresponding to the following general formula

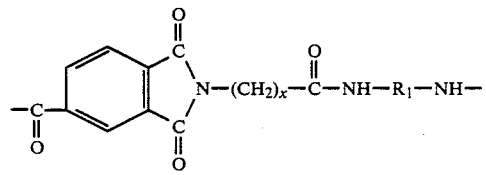

in which $R_1$ and x are as defined above. Component (a) preferably consists of polyamide imides in which $R_1$ is a $C_6$–$C_{15}$ aromatic hydrocarbon radical optionally substituted by methyl groups and/or containing methylene bridges and x is 5.

These polyamide imides are produced in accordance with the teaching of No. DE-AS 1 795 752 (=U.S. Pat. No. 3,658,773); in addition to trimellitic anhydride, lactams corresponding to the following formula

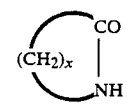

preferably caprolactam (x=5), and (preferably aromatic) diisocyanates $R_1(NCO)_2$, $R_1$ and x having the meanings defined above, are used as starting materials for the production of high molecular weight compounds. Particularly preferred diisocyanates are 2,4-diisocyanatotoluene and/or 4,4'-diisocyanatodiphenylmethane. In principle, it is possible, although less preferred, to use mixtures of different lactams and/or mixtures of different diisocyanates in the production of the polyamide imides. In this case, the meaning of the variables $R_1$ and x would differ according to the particular individual components used, but would still fall within the scope of the above definitions.

As already defined in DE-AS No. 1 795 752, the average molecular weights of the polyamide imides may be varied within wide limits through the duration of the heating step in their production and through the choice of the stoichiometric ratios between the starting materials. In general, the molecular weight of the polyamide imides as determined by osmometry is at least 5000.

Component (b) of the binders according to the invention consists of compounds containing (i) carbodiimide and/or uretone imine groups and (ii) blocked isocyanate groups. The content of carbodiimide groups (expressed as —N=C=N—) is generally 0 to 25% by weight and preferably 1 to 20% by weight while the content of uretone imine groups (expressed as structural units having the formula $C_2N_3O$) is generally 0 to 30% by weight and preferably 0 to 25% by weight, the sum total of carbodiimide and uretone imine groups (formally expressed as —N=C=N—) generally being 0.5 to 25% by weight and preferably 1 to 20% by weight. The content of blocked isocyanate groups (expressed as NCO) is generally 1 to 25% by weight and preferably 5 to 22% by weight.

These compounds may be prepared by blocking 10 to 90%, preferably 20 to 80% and more preferably 30 to 70% of the isocyanate groups of an organic polyisocyanate by reaction with a monofunctional blocking agent for isocyanate groups and then converting 65 to 100% of the remaining free isocyanate groups into carbodiimide groups with elimination of carbon dioxide. The uretone imine groups, if any, present in the compounds are formed by addition of any free isocyanate groups still present onto the carbodiimide groups formed. The preparation of these compounds is described in detail in German Patent Application No. P 36 00 766.8 (DE-OS No. 3 600 766), the embodiments and starting materials described therein as preferred also being preferred in the context of the present invention.

The binders according to the invention contain 1 to 100 parts by weight and preferably 5 to 50 parts by weight of component (b) to 100 parts by weight of component (a). For relatively small quantities of component (b), flexible coverings, i.e. in particular lacquer coatings, are ultimately obtained, the hardness of the coatings and also their resistance to chemicals increasing with increasing content of component (b).

Auxiliaries and additives may optionally be present as component (c) in the binders according to the invention. The auxiliaries and additives in question include, for example, other polyisocyanates containing blocked isocyanate groups, for example the phenol-blocked trimer of 2,4-diisocyanatotoluene containing isocyanurate groups and/or isocyanate-reactive compounds of the type hitherto used in wire lacquering and described, for example, in DE-OS No. 3 600 766. However, the co-use of additional binder components such as these is less preferred.

The binders according to the invention show high solubility in the solvents generally used in wire lacquering. Solvents such as these include in particular phenolic solvents, such as phenol, cresols and/or xylenols. Other suitable solvents are glycols, such as ethylene glycol, propylene glycol, diglycols, such as diethylene glycol and dipropylene glycol, solvents containing ester groups, such as methoxypropylacetate or butylacetate, or ketones, such as methyl isobutylketone. Diluents, such as alkylbenzenes and mixtures thereof, of the type commercially available as solvent naphtha, may also be used in the preparation of the solutions of the binders before they are used in accordance with the invention. The binders according to the invention are preferably used in accordance with the invention in the form of 15 to 60% by weight and preferably 20 to 40% by weight solutions in such solvents or solvent mixtures.

Where the binders according to the invention are used in accordance with the invention, the auxiliaries and additives normally used in lacquer technology may of course be incorporated in the binder solutions mentioned. Auxiliaries and additives such as these include, for example, catalysts which, if at all, may be used in a quantity of 0.01 to 5% by weight and preferably in a quantity of 0.1 to 3% by weight, based on the weight of the binder. In general, however, the temperatures prevailing in the baking tubes normally used for wire lacquers are sufficient to guarantee the reaction, i.e. the hardening, of the lacquers in a sufficiently short time, even in the absence of a catalyst. Suitable catalysts are, for example, tertiary amines, such as N,N-dimethyl aniline, adducts of amines with carbonyl compounds, such as for example the adduct of aniline with butyraldehyde, or organometallic catalysts, such as for example zinc stearate, tin(II) octoate, dibutyltin dilaurate, titanium tetrabutylate or triethanolamine titanate.

The mixtures obtained from the above-mentioned individual components essential to the invention and, optionally, auxiliaries and additives by mixing at room temperature or rather the ready-to-use coating compositions containing the binders according to the invention are stable in storage at room temperature or moderately elevated temperature (up to about 50° C.). The coverings produced using the ready-to-use coating compositions are converted into crosslinked plastics at temperatures above 80° C., preferably at temperatures of 180° to 700° C. and more preferably at temperatures of 200° to 500° C. with simultaneous evaporation of any volatile constituents present (for example solvents).

In this crosslinking reaction, the substantially linear polyamide imides are crosslinked by reaction with the polyisocyanate component (b). The exact mechanism of this crosslinking reaction is not known. In this connection, it is pointed out in particular that, as Applicants' own tests have shown, combinations of polyamide imides of the component (a) type with blocked polyisocyanates free from carbodiimide and uretone imine groups, for example with the phenol-blocked trimer of 2,4-diisocyanatotoluene containing isocyanurate groups, lead to far poorer results. In fact, the above-mentioned disadvantages of the polyamide imides can scarcely be eliminated by the co-use of polyisocyanates of this type. Accordingly, the presence of the carbodiimide and/or uretone imine groups in component (b) is of the utmost importance although no explanation is available for this surprising discovery.

Where the coating compositions are used in accordance with the invention for the production of lacquer coatings on heat-resistant substrates, more especially in the process according to the invention for the production of wire enamels they may be applied to suitable substrates by any of the methods normally used in coating technology, followed by hardening of the coating at temperatures within the above-mentioned ranges. Suitable substrates are, for example, metals, ceramics, glass fibers or glass cloths. Particularly suitable substrates are metal wires.

In the preferred lacquering of metal wires, the wires are coated by the dip coating, roll coating or nozzle stripping processes known per se, followed by drying, i.e. hardening, of the lacquer films in the usual drying ovens at temperatures within the ranges mentioned above.

By virtue of the outstanding electrical and mechanical properties of the hardened coverings, the binders according to the invention are also suitable for the production of insulating cloths or for the impregnation of electrical motors.

In the following Examples, all percentages are percentages by weight.

EXAMPLE 1

Preparation of a polyamide imide (component (a))

250 g 4,4'-diisocyanatodiphenylmethane, 192 g trimellitic anhydride and 113.2 g ε-caprolactam are slowly heated to 150° C. in 290 g cresol and left at that temperature until, after about 2 hours, the evolution of $CO_2$ has abated. The temperature is then increased to 200° C. over a period of about 2 hours. The reaction mixture is stirred for 10 hours at that temperature. The solids content of the solution is adjusted to 20% by addition of 2044.8 g of a mixture of equal parts of cresol and xylene.

Preparation of a blocked polyisocyanate containing carbodiimide and uretone imine groups (component (b))

2160 g cresol is added over a period of 1 hour at 80° C. to a mixture of 2550 g 4,4'-diisocyanatodiphenylmethane and 1740 g 2,4-diisocyanatotoluene and 2,6-diisocyanatotoluene (ratio by weight 8:2), after which the mixture is left to react for about 4 hours at 100 to 120° C. After an NCO content of 13.2% has been reached ($NCO_{theor.}=13.1\%$), the reaction mixture is diluted with 2740 g glyco monomethyl ether acetate.

The carbodiimidization is catalyzed by addition of 20 g methylphospholine oxide (a technical mixture of 1-methyl-1-phospha-2-cyclopentene-1-oxide and 1-methyl-1-phospha 3-cyclo pentene-1-oxide) at 60° C. After about 15 hours, the evolution of $CO_2$ reaches a final value of 201 l (approx. 90%).

A solution of a blocked isocyanate having the following characteristic data is obtained:

| Concentration: | approx. 70% |
| --- | --- |
| Viscosity: | η (23° C.) = 4600 mPa.s |
| Free NCO content: | <0.1% |
| Blocked NCO content (expressed as NCO): | 9.6% |
| IR: | 2140 cm$^{-1}$ (carbodiimide) |
| Carbodiimide content (calculated as -N=C=N- from quantity of $CO_2$): | 2.9% |
| Uretone imine content (calculated as $C_2N_3O$ from quantity of $CO_2$): | 2.2% |

Three different lacquer formulations are prepared using component (a) above.

Lacquer 1 is the above-described solution of component (a).

Lacquer 2 consists of the above-described solution of component (a) to which, based on solids, 10% of a blocked polyisocyanate and 1% of the adduct of 1 mole aniline with 1 mole butyraldehyde have been added. The polyisocyanate used here was prepared by trimerization of some of the isocyanate groups of 2,4-diisocyanatotoluene, removal of the unreacted 2,4-diisocyanatotoluene by distillation and subsequent blocking of the isocyanate groups of the trimer. The content of blocked isocyanate groups (expressed as NCO) is 14%.

Lacquer 3 consists of the above-described solution of component (a) to which, based on solids, 10% of the above-described component (b) and 1% of the above-mentioned adduct of aniline with butyraldehyde have been added.

Accordingly, lacquer 3 consists of 909 g of the above-described 20% solution of component (a), 26 g of the above-described 70% solution of component (b) and 2 g of the above-mentioned adduct of aniline with butyral dehyde.

These three lacquers are applied to a 0.7 mm diameter copper wire in three parallel tests. The wire passes through the lacquer applicator six times. After each pass, the excess lacquer entrained by the wire is retained by a correspondingly calibrated stripping nozzle. The wire then passes through the baking oven in which the solvents are removed and the film-forming binder is crosslinked. The coating thus applied in six layers has a thickness of 27.5 μm which means that the lacquer coating increases the diameter of the copper wire by about 55 μm.

| Oven length (m): | 4 |
| --- | --- |
| Oven temperature (°C.): | 400 |
| Calibration of the stripping nozzles (mm): | 0.74, 0.76, 0.78, 0.80, 0.82 and 0.84. |

In the case of lacquer 1, good wire enamel properties are only obtained up to a lacquering speed of 9 m/minute The softening temperature of the lacquer is 300° C. The increase in the curve of the dielectric loss factor tan δ (DIN 53 483) occurs at 210° C.

In the case of lacquer 2 good wire enamel properties are equally only obtained up to a lacquering speed of 9 m/minute. The softening temperature of the lacquer in this case is 310° C. and the increase of the dielectric loss factor tan δ occurs at 210° C.

In the case of lacquer 3, the properties just mentioned can be achieved even at a lacquering speed of 15 m/minute. Distinctly better properties are obtained at a lacquering speed of only 9 m/minute. The increase in the dielectric loss tan δ does not occur until 240° C.; the softening temperature is 400° C.

EXAMPLE 2

Preparation of a polyisocyanate component (b) 2160 g cresol are added dropwise over a period of 2 h at 80° C. to 5000 g 4,4'-diisocyanatodiphenylmethane, after which the mixture is left to react at 120° C. An NCO content of 11.8% is reached after about 4 h ($NCO_{theor}=11.7\%$). The reaction mixture is diluted by addition of 3070 g methoxypropyl acetate to form a 70% solution having an NCO content of 8.3% ($NCO_{theor}=8.2\%$).

The carbodiimidization is catalyzed by the addition at 60° C. of 20 g (0.2%) methylphospholine oxide (a technical mixture of 1-methyl-1-phospha-2-cyclopentene-1-oxide and 1-methyl-1-phospha-3-cyclopentene-1-oxide) and is followed by measurement of the evolution of $CO_2$. After about 12 h, the evolution of gas stops at 220

1 $CO_2$ (>90% of the maximum theoretical quantity). The calculated conversions, based on the evolution of $CO_2$, and the reduction in the NCO content follow parallel trends.

A solution of a blocked isocyanate having the following characteristic data is obtained:

| | |
|---|---|
| Concentration: | approx. 70% |
| Viscosity: | $\eta$ (23° C.) = 6000 mPa.s |
| Free NCO content: | <0.1% |
| Blocked NCO content: | 8.5% (analytical method: 30 mins/180° C. with di-n-butylamine in o-dichlorobenzene) |

Lacquer formulation 666.5 g of the solution of component (a) according to Example 1

95.3 g of the above-mentioned 70% isocyanate solution (b)

2.0 g of the aniline/butyraldehyde adduct according to Example 1.

A 0.7 mm diameter copper wire is coated with this lacquer solution as described in Example 1 to an increase in diameter of approximately 55 μm.

At a lacquering rate of 12 m/minute, the softening temperature is 430° C. The increase in the dielectric loss factor tan δ occurs at 280° C.

Determination of the increase in the dielectric loss factor:

The dielectric loss factor tan δ according to DIN 53 483 (2.3.) is a measure of the energy losses which arise out of the fact that part of the energy of the electrical field is used for heating.

Before the test, the wire sample is coated with an aqueous graphite dispersion and dried for 2 hours at around 90° C.

The dielectric loss factor is measured between the copper conductor and the graphite coating.

If this value is measured as a function of temperature, there is an increase in the measured value at a certain temperature. The temperature indicated in each of the preceding Examples is the temperature at which this increase in the measured value begins. The temperature is a measure of the heat resistance of the lacquer enamel.

What is claimed is:

1. Lacquer binders containing polyamide imides suitable for the production of highly heat-resistant films and coatings mixtures of (a) high molecular weight compounds containing recurring structural units corresponding to the following general formula

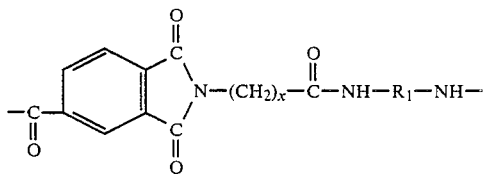

in which

R₁ is an alkylene radical, a cycloalkylene radical or an arylene radical optionally containing methylene bridges, these radicals optionally being substituted by alkyl groups or halogen, and x is an integer of 2 to 12, and organic compounds containing (i) carbodiimide and/or uretone imine groups and (ii) blocked isocyanate groups, with 1 to 100 parts by weight of component (b) being used to parts by weight of component (a).

2. Lacquer binders as claimed in claim 1, characterized in that component (a) is a polyamide imide containing recurring structural units corresponding to the general formula in claim 1 in which R₁ is a difunctional $C_6$–$C_{15}$ aromatic hydrocarbon radical optionally substituted by methyl groups and/or containing methylene bridges and x is the number 5.

3. Binders as claimed in claim 1, characterized in that component (b) contains 0 to 25% by weight carbodiimide groups (expressed as —N=C=N—), 0 to 30% by weight uretone imine groups (expressed as structural units having the formula $C_2N_3O$), the sum total of carbodiimide and uretone imine groups (formally expressed as —N=C=N—) being 0.5 to 25% by weight, and 1 to 25% by weight blocked isocyanate groups (expressed as NCO).

4. Binders claimed in claim 1 in coating compositions for heat-resistant substrates.

5. Binders in coating compositions as claimed in claim 4 in wire lacquers.

6. A process for the production of wire enamels by coating wires with a coating composition containing binders and inert solvents with subsequent hardening of the coating at temperatures above 80° C., characterized in that coating compositions containing as binders those claimed in claim 1 are used.

* * * * *

UNITED STATES PATENT AND TRADEMARK OFFICE
CERTIFICATE OF CORRECTION

PATENT NO. : 4,954,577

DATED : September 4, 1990

INVENTOR(S) : Willi Dunwald; Hans Schlegel; Reinhard Halpaap; Josef Pedain

It is certified that error appears in the above-identified patent and that said Letters Patent is hereby corrected as shown below:

Column 7, line 51, after "coatings" the phrase --which comprises-- should appear;

Column 8, line 19, before "organic" the designation --b)-- should appear; and

Column 8, line 22, before "parts" the number --100-- should appear.

Signed and Sealed this

Eighth Day of September, 1992

Attest:

DOUGLAS B. COMER

Attesting Officer

Acting Commissioner of Patents and Trademarks